United States Patent [19]

Dremann

[11] 4,026,072

[45] May 31, 1977

[54] SELF-CLEANING MUFFLER FOR AN ABRASIVE BLAST SYSTEM

[76] Inventor: George H. Dremann, 1490 Hopkins St., Berkeley, Calif. 94707

[22] Filed: Aug. 9, 1976

[21] Appl. No.: 712,592

[52] U.S. Cl. .............................. 181/36 A; 51/410
[51] Int. Cl.² .......................................... B24C 7/00
[58] Field of Search .................................. 51/8 R, 12

[56] References Cited

UNITED STATES PATENTS

| 1,899,528 | 2/1933 | Rosenberger | 51/12 |
| 3,741,738 | 6/1973 | Dowgin | 51/12 |
| 3,852,918 | 12/1974 | Black | 51/12 |

*Primary Examiner*—Al Lawrence Smith
*Assistant Examiner*—Robert C. Watson

*Attorney, Agent, or Firm*—Bruce & McCoy

[57] ABSTRACT

A self-cleaning muffler for an abrasive blast system comprised of a chamber element having side walls, an end wall, and an inlet portion opposite said end wall, means for attaching the inlet portion of said chamber element to the exhaust outlet means of the abrasive blast system, perforation means in the chamber element side walls to permit gaseous media to escape from said chamber element, but preventing particulate media from passing therethrough, a particulate media outlet means in the end wall of said chamber element, and means for closing said particulate media outlet means substantially during exhausting of the abrasive blast system and opening the particulate media outlet means when the abrasive blast system is not exhausting.

10 Claims, 4 Drawing Figures

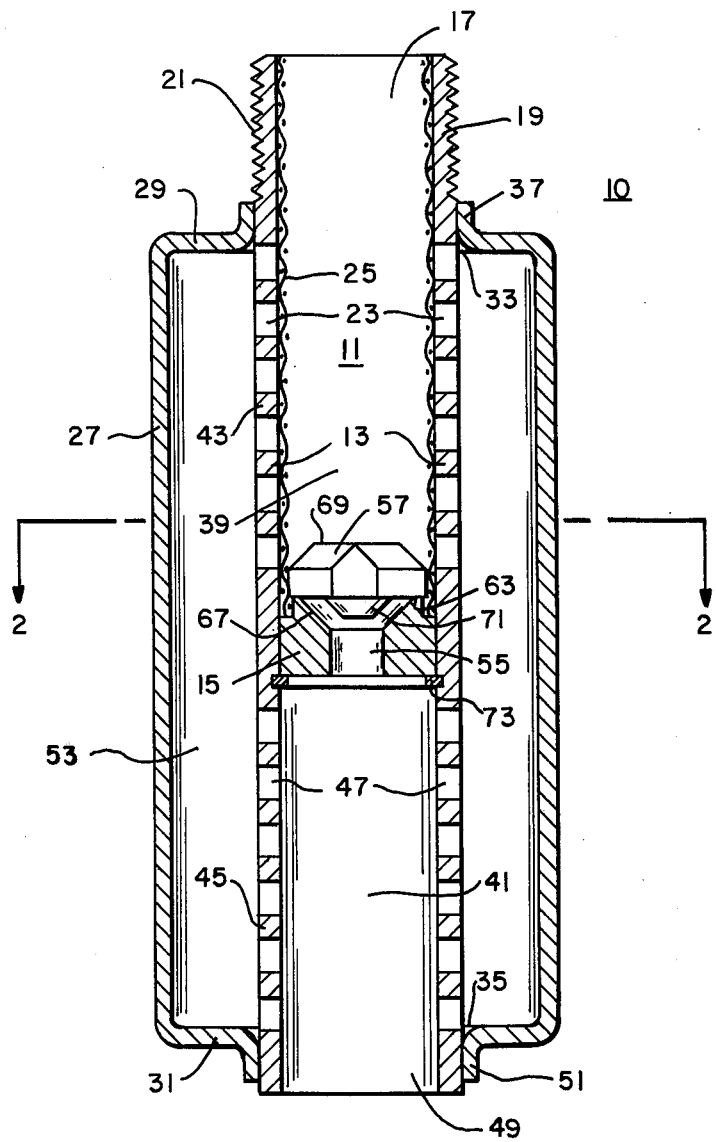
FIG.—1
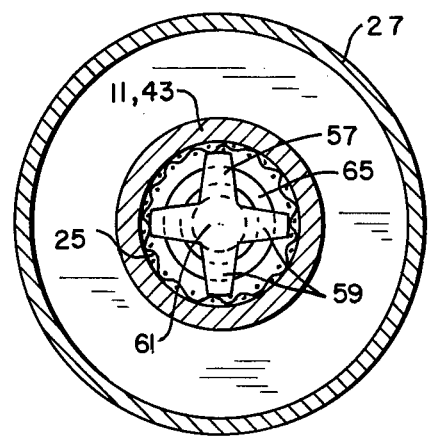
FIG.—2

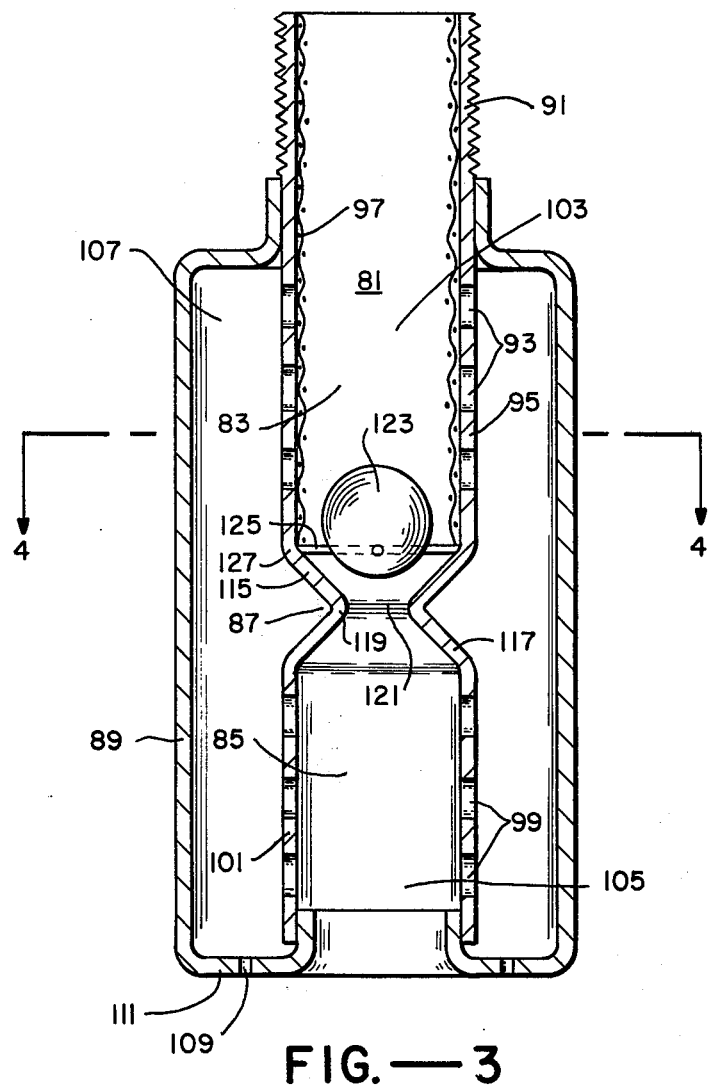
FIG.—3
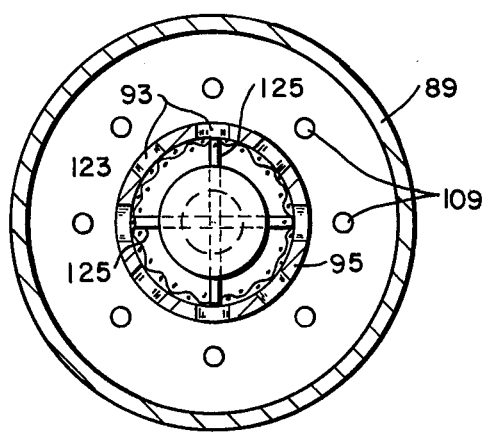
FIG.—4

4,026,072

SELF-CLEANING MUFFLER FOR AN ABRASIVE BLAST SYSTEM

BACKGROUND OF THE INVENTION

1. Field of the Invention

The present invention relates to abrasive blasting equipment and more particularly to a self-cleaning muffler which muffles the exhaust noise of an abrasive blast system and traps any particulate abrasive media which may exist in the system's exhaust.

2. Description of the Prior Art

Abrasive blast systems are pneumatic systems having, as a central component, an abrasive media holding tank which must be pressurized when the system is operated. When a blasting operation is terminated this holding tank (which can have one or more chambers) is rapidly depressurized through an exhaust line which on most conventional systems is remotely controlled by a pneumatically actuated exhaust valve. To trap abrasive media carried in the system's exhaust, an abrasive trap is often placed in line between the exhaust valve and the holding tank.

There are two well known problems associated with the depressurization of a conventional abrasive blast system. The first problem involves the environmental consideration of noise. When a conventional system depressurizes it does so with a loud blast or bang caused by high velocity air suddenly flowing out of the end of the exhaust line. The second problem is one of safety. As the system depressurizes particulate abrasive media is propelled at high velocity out of the exhaust line. The presence of an abrasive trap substantially mitigates this problem, however, it does not totally eliminate it. Although the outlet of the exhaust line is normally pointed downward to direct the high velocity exhaust into the ground, a person in the vicinity of the exhaust line nonetheless runs the risk of being struck by high velocity particulate.

The present invention overcomes the above problems of exhaust noise and exhausted high velocity particulate media by providing a self-cleaning muffler capable of being attached to the end of the abrasive blast system's exhaust line. The muffler according to the present invention both muffles the loud exhaust noise of the system and traps the high velocity particulate media carried by the exhaust, while permitting the trapped particulate to fall harmlessly to the ground once the abrasive holding tank has depressurized, that is, once the exhausting period of the system is completed.

SUMMARY OF THE INVENTION

The present invention is a self-cleaning muffler for the exhaust outlet means of an abrasive blast system. The invention is comprised of a chamber element having side walls, an end wall, and at least one inlet portion opposite the end wall. Means are provided for attaching the inlet portion of the chamber element to the exhaust outlet means of the abrasive blast system such that when the abrasive blast system is depressurized the exhaust emitted through the exhaust outlet means is directed into the chamber element toward the chamber element's end wall. Perforation means are provided in the chamber element side walls to permit gaseous media to escape from the chamber element while at the same time preventing particulate media from passing therethrough. A particulate media outlet means is located in the chamber element's end wall. Means are provided for closing this particulate media outlet means using the kinetic force of the exhaust which is directed in through the chamber element inlet means from the abrasive blast system, and for opening the particulate media outlet means in the absence of an exhaust flow whereby exhausted particulate media is trapped in the chamber element until the abrasive blast system is substantially depressurized at which time the particulate media falls by gravity out of the chamber element.

OBJECTS OF THE INVENTION

It is therefore an object of the present invention to provide a self-cleaning muffler which is adapted to be attached to the exhaust outlet of an abrasive blast system.

It is another object of the present invention to provide a self-cleaning muffler capable of substantially reducing the level of the abrasive blast system's exhaust noise.

It is a further object of the present invention to provide a self-cleaning muffler capable of trapping exhausted high velocity particulate media.

It is still another object of the present invention to provide a self-cleaning muffler wherein after the abrasive blast system is substantially depressurized the particulate media trapped in the muffler is allowed to fall harmlessly to the ground.

It is still a further object of the present invention to provide a self-cleaning muffler which can be used in connection with a wide variety of abrasive blast systems and which can be manufactured and sold at relatively low cost.

Yet other objects of the invention will become apparent from the following specification and claims.

DESCRIPTION OF THE DRAWINGS

FIG. 1 is a cross-sectional view of a preferred embodiment of the self-cleaning muffler of the present invention.

FIG. 2 is a cross-sectional view of the self-cleaning muffler shown in FIG. 1 taken along lines 2—2.

FIG. 3 is a cross-sectional view of an alternative embodiment of the self-cleaning muffler of the present invention.

FIG. 4 is a cross-sectional view of the self-cleaning muffler shown in FIG. 3 taken along lines 4—4.

DESCRIPTION OF THE PREFERRED EMBODIMENT

The present invention is a self-cleaning muffler adapted to be attached to the exhaust outlet means of an abrasive blast system. When so attached the muffler will intercept high velocity exhaust being expelled from the system and will substantially reduce exhaust noise and trap high velocity particulate media carried in the exhaust. An important feature of the present invention is that particulate once trapped is caused to drop harmlessly out of the muffler after the abrasive blast system has substantially depressurized.

Turning now to the drawings and to the embodiment shown in FIGS. 1 and 2, the muffler 10 consists of a chamber element 11, preferably of a cylindrical shape, having side walls 13 and an end wall 15. An inlet portion 17 of the chamber element is situated opposite end wall 15; when the muffler is attached to the exhaust outlet means of an abrasive blast system (not shown), the system's exhaust outlet means is placed in fluid connection with this inlet portion such that exhaust emitted through the exhaust outlet means is directed into the chamber element and toward the chamber element end wall. The inlet portion is actually formed by extending the cylindrical chamber element 11 to form a neck portion 19. External pipe threads 21 on the neck permit this end of the chamber element, and hence the muffler, to be screwed into an exhaust outlet means having corresponding internal pipe threads. (The exhaust outlet means would typically but not necessarily be the open end of an exhaust pipe.)

Perforation means in the side walls 13 of the chamber element allows air exhausted into the chamber element 11 to escape therefrom through the side walls; the perforation means at the same time is designed to prevent the passage of any particulate media therethrough. Referring to FIG. 1, the perforation means consists of a plurality of holes 23 formed in side walls 13, and a durable and replaceable wire mesh material 25 covering the holes with the mesh opening size being chosen to prevent particulate abrasive media from passing therethrough. Preferably, the side wall holes will be uniformly and relatively closely spaced around the entire circumference of the cylindrical side wall between neck 19 and end wall 15, with the mesh material formed to tightly fit within the chamber element and line the entire inside surface of the side wall from the end wall to substantially the top of the neck.

The above-described chamber element 11 is designed on the theory that exhaust noise will be substantially reduced or muffled within this primary chamber element. However, additional reduction of the exhaust noise can be achieved by providing a further outer sound restriction jacket. In the embodiment shown, this sound restriction jacket is comprised of outer enclosure wall 27 having a top end wall 29 in which there is formed a centrally disposed opening 33 through which the chamber element 11 is inserted. The edges of opening 33 are bent upwardly to form a flange 37 whereby the top wall portion of enclosure wall 27 can be readily secured to the chamber element, such as by spot welding, preferably just below the chamber element's threaded neck portion 19. It is noted that the chamber element 11 in the preferred embodiment is elongated so as to extend substantially below end wall 15 whereby the end wall actually divides chamber elememt 11 into an upper chamber portion 39 and a lower chamber portion 41 having, respectively, upper side walls 43 and lower side walls 45. The upper side walls of the upper chamber consist of the holes 23 and the mesh material 25 heretofore described; the lower side walls of the chamber element, like the upper side walls, have perforation means, however, the perforation means in the lower side walls consist solely of a plurality of holes 47 for permitting the passage of air through the lower walls. A mesh material is not required in lower chamber 41 for the reason that there is no need to prevent particulate media from flowing through this wall. The lower chamber 41 could, however, be filled by a porous noise reducing material. The end of lower chamber portion 41 opposite end wall 15 is open to atmosphere and forms an exhaust outlet 49 for the muffler 10.

As shown, the outer enclosure wall 27, which also extends to surround lower wall 45 of chamber element 11, also has a bottom wall 31 in which there is formed an opening 35 coaxially aligned with the corresponding opening 33 in the top wall portion 29. A flange 51 is formed at this bottom enclosure wall opening for securing the bottom of the enclosure wall to the bottom end of the chamber element. Thus, it can be seen that there is an inner elongated chamber element 11 extending entirely through the attached outer enclosure wall 27. With the presence of end wall 15 the muffler 10 is therefore divided into three separate but communicating chambers—the upper and lower chambers 39 and 41 of chamber element 11 heretofore described, and an interconnecting annular chamber 53 surrounding the upper and lower perforated side walls 43, 45 of the chamber element. The high velocity air of the abrasive blast system's exhaust passes through muffler 10 by being directed through the inlet portion 17 of chamber element 11 and into the chamber element's upper chamber portion 39, from there through the upper side walls of the chamber element and on through interconnecting chamber 53, and from there back through the chamber element's lower side walls 45 and finally out the exhaust outlet 49 of the muffler.

It is noted from the above that only the air or gaseous media of the exhaust passes through the chamber element's side walls; the particulate media carried by the exhaust air is trapped in upper chamber 39 of the chamber element so as to collect above end wall 15. An important feature of the present invention is the presence of a particulate media outlet means in the chamber element's end wall 15 which is closed substantially during the exhausting period of the abrasive blast system, and which then opens substantially when exhausting is terminated. The exhausted particulate media is thus trapped in the upper chamber portion 39 of chamber element 11 only until the abrasive blast system is substantially depressurized whereupon the particulate media is permitted to fall by gravity out of the muffler.

In the embodiment shown in FIG. 1, the particulate outlet means is comprised of an opening 55 in end wall 15 and a plug element 57 disposed thereabove. The plug element is fabricated from elastomeric material, and, as best illustrated in FIG. 2, preferably has a star shape with a plurality of leg portions 59 radially extending from a central portion 61 which is at least as large as the bottom wall opening 55. Preferably, the outer diameter of the star shaped plug member 57 is such that the plug element will snugly fit within the upper chamber portion 39 by lightly wedging against the mesh material 25. Since the plug element is not fixably attached to any portion of the chamber element, proper sizing of the plug element will prevent any undesirable movement of the plug element within the chamber element. The star shaped plug element 57 is supported on shoulder 63 formed on the outermost perimeter of the chamber element bottom wall 15. This shoulder is relatively narrow so as to engage only the extreme ends of the radially extending leg portions 59 of the plug element 57 leaving openings 65 between the extended legs through which the trapped particulate matter is permitted to fall.

A tapered or conically shaped seating surface 67 is formed on the end wall between shoulder 63 and opening 55. When exhaust from the abrasive blast system enters the upper chamber 39 through inlet portion 17 the kinetic force of the exhaust is directed against the upper surface 69 of the plug member to deform the plug member until it firmly seats against seating surface 67. When thusly deformed and seated the central portion 61 of the plug member closes opening 55. To provide additional sealing, tapered button element 71 is formed on the bottom side of plug element 57 facing end wall opening 55 so that when the plug element is deformed to cover the end wall opening the projecting buttom element mates with the lowermost edge of the tapered seating surface 67. The button element essentially acts like a cork to plug the end wall opening.

It can therefore be seen that when high velocity exhaust is directed into chamber element 11 the plug element 57 will close end wall opening 55 thereby trapping particulate media within upper chamber portion 39; when the exhausting is substantially terminated, that is, when there is insufficient kinetic force to hold the plug element in its deformed position against end wall opening 55, the end wall opening will open to permit whatever particulate media is trapped in the upper chamber to fall harmlessly out of the muffler. In this manner, the muffler is self-cleaning after each depressurization of the abrasive blast system.

In its preferred construction, the end wall 15 is a separate element which is closely fitted within chamber element 11 and held therein by snap ring retainer 73 or some other suitable securing device.

FIGS. 3 and 4 of the drawings show an alternative embodiment of the present invention. Like the above-described embodiment of FIGS. 1 and 2, this embodiment of the invention has a chamber element 81 divided into upper and lower chamber portions 83 and 85 by an end wall 87. The chamber element has an elongated cylindrical shape and is surrounded by outer enclosure 89, except for a projecting threaded extension portion 91 which screws into the exhaust outlet means of the abrasive blast system. A plurality of holes 93 are formed in the upper cylindrical side wall 95 of the chamber element with a mesh material 97 lining to the inside surface of this upper side wall. An additional plurality of holes 99 are also formed in the chamber element's lower cylindrical side wall 101 such that the upper and lower chambers 103 and 105 of the chamber element communicate through the annular interconnecting chamber 107 formed by outer enclosure wall 89. It is noted that additional venting is provided in this embodiment of the invention by vent openings 109 formed in the bottom wall portion 111 of the outer enclosure wall.

The difference between the alternative embodiment of the invention shown in FIGS. 3 and 4 and the embodiment shown in FIGS. 1 and 2 rests in the construction of the end wall 87 of chamber element 81 and in the design of the particulate media outlet means for regulating the flow of particulate through this end wall. In this alternative embodiment, the end wall 87 is created by a restriction in the chamber element 81 located substantially midway between the ends thereof. As shown, the restriction forms opposing tapered or conical surfaces 115 and 117 whose intersection 119 forms an opening 121 between upper and lower chamber portions 83 and 85. A preferably spherical plug element 123, which is preferably fabricated from an elastomeric material, is supported above opening 121 as well as the upper tapered surface 115 by a pair of crossed wire springs 125. The plug element must necessarily be larger than the end wall opening 121, but small enough to fit within the chamber element. The wire springs, which are fixably inserted through the plug element, radially extend therefrom a sufficient distance to permit the ends of the wire springs to engage the chamber element's upper side walls 95. It is seen that the plug element with its cross wire springs can be easily inserted into the upper chamber portion 83 such that the wire springs lodge against the intersection 127 of the upper cylindrical side wall 95 and the upper end of tapered surface 115. The wire springs 125 will allow the kinetic force of the exhaust directed into upper chamber portion 83 to depress the plug element 123 downwardly until it seats against the tapered surface 115 whereupon the end wall opening 121 will be closed. This plug element, though different in construction, therefore operates in the same manner and on the same principle as the plug element described in the previous embodiment of the invention.

It is understood that several variations are possible on the basic design of the invention illustrated in the preferred embodiments of FIGS. 1-4. For example, instead of providing a sound muffling jacket member in the form of an outer enclosure wall, a sound muffling jacket member might consist of a porous material which closely surrounds the outer surface of the chamber element's side walls. Such a design would eliminate the need for the extended chamber structure beneath the chamber element end wall. It would also be possible to provide end wall plug elements having different shapes and which are adapted to releasably close one or a multiple of end wall openings.

The present invention provides a self-cleaning muffler which can be attached to the exhaust outlet or outlets of an abrasive blast system for reducing the abrasive blast system's exhaust noise level and for trapping high velocity particulate media carried in the system's exhaust. The muffler is self-cleaning in that after exhausting of the abrasive blast system is completed the particulate media trapped within the muffler is caused to fall harmlessly to the ground or to any suitable container which may be placed under the muffler.

Although the present invention has been described in considerable detail in the foregoing specification, it is not intended that the invention be limited to such detail except as may be necessitated by the appended claims.

What I claim is:

1. A self-cleaning muffler for an abrasive blast system having an exhaust outlet means comprising
   a chamber element having side walls, an end wall, and at least one inlet portion opposite said end wall,
   means for fluidly connecting the inlet portion of said chamber element to the exhaust outlet means of said abrasive blast system such that when said abrasive blast system is depressurized the exhaust emitted through said exhaust outlet means is directed into said chamber element toward said end wall,
   perforation means in said chamber element side walls for permitting the gaseous media of said exhaust to escape from said chamber element, but for preventing particulate media from passing therethrough,
   a particulate media outlet means located in said chamber element's end wall, and
   means for closing said particulate media outlet means by the kinetic force of the exhaust directed through said inlet means from said abrasive blast system, and opeing said paticulate media outlet means in the absence of said exhaust whereby exhausted particulate media is trapped in said chamber element until the abrasive blast system is substantially depressurized at which time the particulate media falls by gravity out of said chamber element.

2. The self-cleaning muffler of claim 1 wherein said perforation means includes
   a plurality of holes formed in said chamber element side walls to permit gaseous media to flow therethrough, and
   a durable mesh material closely fitted to said side walls to cover said plurality of side wall holes, said mesh material having a mesh opening size to prevent particulate media in the abrasive blast system's exhaust from passing therethrough.

3. The self-cleaning muffler of claim 1 wherein said particulate media outlet means and means for closing and opening same includes
   at least one opening in the end wall of said chamber element,
   a plug element disposed in said chamber element, and
   means for supporting said plug element in spaced relation above said opening when the abrasive blast system is not exhausting, but permitting the plug element to be returnably forced against said opening by the exhaust from said abrasive blast system whereby when the abrasive blast system is exhausting the opening in the end wall of said chamber element is closed by said plug element thereby trapping exhausted particulate media in said chamber element above said chamber element end wall, and when said abrasive blast system is substantially depressurized, and thus the exhausting of the system is substantially terminated, said plug element returns to its position above said opening whereby whatever particulate media is trapped in said chamber element flows by gravity out through said end wall opening.

4. The self-cleaning muffler of claim 3 wherein said plug element is fabricated from an elastomeric material and has a generally star shape with a plurality of leg portions radially extending from a center portion which is at least as large as said bottom wall opening, and
   said means for supporting said plug element includes
   a shoulder formed on the outermost perimeter of said chamber element bottom wall so as to engage the extreme ends of the radially entending leg portions of said plug element, said bottom wall shoulder and said bottom wall opening having a tapered seating surface therebetween whereby when exhaust from said abrasive blast system is directed against said elastomeric plug element said plug element deforms to seat against said tapered seating surface thereby closing said bottom wall opening, and whereby in the absence of said exhaust the plug element having assumed its normal shape is supported above said opening on said bottom wall shoulder whereby whatever particulate media is trapped in said chamber element can flow between the legs of said star-shaped plug element and out through said bottom wall opening.

5. The self-cleaning muffler of claim 4 wherein a tapered button element projects from the center portion of said plug element on the side thereof facing said end wall opening whereby said plug element is deformed to close said end wall opening said tapered button element mates with the lower edge of said tapered seating surface on said end wall to seal closed said end wall opening.

6. The self-cleaning muffler of claim 3 wherein said plug element has a generally spherical shape of a diameter larger than said bottom wall opening, but small enough to loosely fit within said chamber element, and
   said means for supporting said plug element includes
   at least one wire spring member attached to said plug element and extending therefrom to engage the side walls of side chamber element, said chamber element end wall being tapered substantially from said side walls downwardly to said end wall opening whereby said spring member lodges against said side walls at the intersection of said side walls with said tapered end wall whereby in the absence of exhaust from said abrasive blast system said plug element is supported above said bottom wall opening to permit whatever particulate media is trapped inside said chamber element to flow therethrough whereas when exhaust is directed against said plug element said plug element is forced against said bottom wall opening to close same.

7. The self-cleaning muffler of claim 1 further comprising a jacket member surrounding said chamber element for further muffling the sound of the exhaust from said abrasive blast system.

8. The self-cleaning muffler of claim 7 wherein said jacket member is a porous material closely surrounding the side walls of said chamber element.

9. The self-cleaning muffler of claim 7 wherein
   said chamber element extends below said bottom end wall such that there are upper and lower side walls above and below the chamber element's end wall, said lower side walls also having a plurality of holes therein and forming at the bottom end thereof an exhaust outlet for said self-cleaning muffler, and
   said jacket member includes an outer enclosure wall surrounding the upper and lower side walls of said chamber element so as to form an annular interconnecting chamber therebetween whereby the gaseous media of said abrasive blast system exhaust will flow out through the upper side walls of said chamber element, through said interconnecting chamber, and from there back in through the lower side of walls of said chamber element and out the exhaust outlet of said self-cleaning muffler.

10. A self-cleaning muffler for an abrasive blast system having an exhaust outlet means comprising
    a cylindrical chamber element having an upper cylindrical side wall, a lower cylindrical side wall, an end wall between said upper and lower cylindrical side walls, an exhaust inlet portion at the end of said upper cylindrical side wall opposite said end wall, and an exhaust outlet at the end of said lower cylindrical side wall opposite said end wall, said end wall having at least one opening of a size to permit particulate media in the abrasive blast system's exhaust to pass therethrough,
    means for fluidly connecting the inlet portion of said chamber element to the exhaust outlet means of said abrasive blast system such that when said abrasive blast system is depressurized the exhaust emitted through said exhaust outlet means is directed into said chamber element toward said end wall,
    a plurality of holes in said upper and lower cylindrical side walls to permit the gaseous media of said exhaust to pass therethrough,
    a durable mesh material closely fitted to the inner surface of said upper cylindrical side wall, said mesh material having a mesh opening size to prevent particulate media in the abrasive blast system's exhaust from passing therethrough, a cylindrical outer enclosure wall surrounding the upper and lower side walls of said chamber element to form an annular interconnecting chamber therebetween whereby the gaseous media of said abrasive blast system's exhaust will flow out through the upper side walls of said chamber element, through said interconnecting chamber, and from there back through the lower side walls of said chamber element and out the exhaust outlet of said muffler, a plug element disposed in the upper chamber portion of said chamber element formed by said upper cylindrical side wall, means for supporting said plug element in spaced relation above said end wall open when no external force is applied to said plug element, but permitting said plug element to be returnably forced against said end wall opening by the exhaust from said abrasive blast system whereby when the abrasive blast system is exhausting the opening in the end wall of said chamber element is closed by said plug element thereby trapping exhausted particulate media in the chamber element above said bottom wall, and when said abrasive blast system is substantially depressurized, and thus the exhausting of the system is substantially terminated, said plug element is returned to its position above said opening whereby whatever particulate media is trapped in said chamber element flows by gravity out through said end wall opening and from there out through the exhaust outlet of said muffler.

* * * * *